United States Patent [19]

Higgins

[11] 4,061,787

[45] Dec. 6, 1977

[54] COLLAGEN COMPOSITIONS HAVING CROSSLINKING AGENT INCORPORATED THEREIN AND THE METHOD OF PREPARING THE SAME

[75] Inventor: Thomas Engel Higgins, Brookfield, Ill.

[73] Assignee: Union Carbide Corporation, New York, N.Y.

[21] Appl. No.: 666,612

[22] Filed: Mar. 15, 1976

[51] Int. Cl.$^2$ .............................................. A22C 13/00
[52] U.S. Cl. ................................... 426/140; 426/278; 426/277; 426/657; 426/652; 426/646
[58] Field of Search ............... 426/140, 278, 277, 657, 426/652, 646

[56] References Cited

U.S. PATENT DOCUMENTS

| 3,928,653 | 12/1975 | Dowell et al. | 426/140 X |
| 3,956,512 | 5/1976 | Higgins et al. | 426/140 |

OTHER PUBLICATIONS

Bailey's Industrial Oil and Fat Products, Edited by Swern, 3rd ed., 1964, Interscience Publishers (New York), pp. 16, 19, 22.

*Primary Examiner*—Joseph M. Golian
*Attorney, Agent, or Firm*—David Fink

[57] ABSTRACT

A homogeneous, formable collagen composition having uniformly incorporated therein at least about 0.5% by weight up to about 15% by weight based on the solids content thereof of a crosslinking agent selected from the group consisting of unsaturated fatty acids having more than two double bonds, di and tri-fatty acid esters of a polyhydric alcohol and unsaturated fatty acids having more than two double bonds, natural oils containing fatty acid esters with at least 11% by weight of the fatty acid residues thereof having more than two double bonds, fatty acid esters of an unsaturated fatty acid and an unsaturated fatty alcohol, and mixtures of the same, said collagen compositions being formable into shaped collagen structures that exhibit improved strength characteristics.

19 Claims, No Drawings

COLLAGEN COMPOSITIONS HAVING CROSSLINKING AGENT INCORPORATED THEREIN AND THE METHOD OF PREPARING THE SAME

The present invention relates to improved collagen food casings, and more particularly to collagen compositions especially useful for the preparation of edible collagen food casings that exhibit improved cooking characteristics, and to the method of preparing such compositions.

For a number of years thin-wall sausage casings have been prepared from processed animal collagen and, more recently, edible casings of collagen have been prepared and sold in commercial quantities. Commercially available edible collagen casings have proven to be a suitable replacement for natural casings in the preparation of food products, such as fresh pork sausages, wherein a meat emulsion of the pork sausage type is stuffed, linked and packaged without cooking, the encased sausage product then being suitable for cooking by the consumer without the need to remove the casing. Edible collagen casings have also been used for preparing sausage products, such as frankfurters, wherein the stuffed and linked food casings are cooked prior to packaging, but the highly automated processing techniques and wide variety of processing procedures that are employed have presented many difficulties have limited the acceptance thereof.

The delicate, fragile nature of formed collagen structures, such as food casings, and problems encountered during the processing thereof are well known and methods of overcoming such problems have been the subject of a number of patents. A number of recent patents have also been directed to the preparation of edible collagen food casings that exhibit improved physical properties or to meet other special requirements for food casings, such as their performance during stuffing and cooking operations.

It is well known, for example, as disclosed in U.S. Pat. Nos. 3,123,482 and 3,413,129 to Lieberman, U.S. Pat. No. 3,446,633 to Talty, and U.S. Pat. No. 3,525,628 to Cohly, that collagen tubing prepared by extruding a fluid, low collagen solids mass involves processing by passing the tubing through a bath containing chemical hardening or tanning agents. Alternative methods, such as disclosed, for example, in U.S. Pat. Nos. 3,551,535 and 3,782,977 to Henderson et al, provide for the preparation of collagen tubing from collagen compositions containing collagen solids greater than 6% without the need for chemical hardening agents.

Whereas the casings prepared by treatment with tanning agents are generally quite strong and can be handled during processing, reeling, shirring, packaging, etc, in view of the difficulties encountered during the various processing operations, the development of a process for the production of collagen casing having satisfactory strength and handling characteristics without the need for subjecting the tubing to tanning agents would be desirable. Casings prepared by extruding high collagen solids compositions have been found to be strong enough to exhibit suitable handling and processing characteristics without the need for treatment with chemical hardening agents. It has been found, however, that casings which are shirred and packaged satisfactorily, and handle properly during stuffing, may often tend to split during cooking. The development of a process that would also eliminate or improve such characteristics would, therefore, be a desirable improvement.

It has been suggested in the past, as, for example, disclosed in U.S. Pat. Nos. 2,114,220 to Freudenberg et al, 3,446,633 to Talty, and 3,551,535 to Henderson et al, that various materials may be incorporated in collagen compositions during their preparation to improve or modify the properties of the collagen structures prepared therefrom; and as disclosed, for example, in U.S. Pat. No. 3,627,542 to Cohly et al, that materials may be used to treat tubular collagen casings during the processing thereof to improve the casing cooking properties and reduce "frying splits" of the casing. Further, in the copending patent application of T. E. Higgins, Ser. No. 572,322, filed Apr. 28, 1975, now U.S. Pat. No. 3,956,512 a process is described in which formable collagen compositions are prepared having certain types of fatty acid esters incorporated therein, the tubular food casing prepared therefrom exhibiting improved anti-block characteristics and improved resistance to "frying splits."

The need still exists for the development of even further improvements in the cooking and handling properties of collagen food casings, particularly when such improvements can be realized by methods that reduce the number or difficulty of processing steps for the preparation of the tubular food casing.

In accordance with the present invention there is provided a method for preparing improved collagen compositions which comprises uniformly incorporating a crosslinking or hardening agent selected from the group consisting of unsaturated fatty acids containing more than two double bonds, di and tri fatty acid esters of a polyhydric alcohol and unsaturated fatty acids containing more than two double bonds, natural oils containing fatty acid esters with at least 11% by weight of the fatty acid residues thereof having more than two double bonds, fatty acid esters of an unsaturated fatty acid and an unsaturated fatty alcohol, and mixtures of the same, into a formable collagen composition in an amount of at least about 0.5% by weight of the solids content of said collagen composition. It has been discovered that the use of such improved collagen compositions surprisingly and unexpectedly results in shaped collagen structures such as, for example, tubular collagen food casings, that exhibit improved strength characteristics, improved linking and stuffing properties, and reduced frying splits without the need for treatment with or addition of other chemical hardening or tanning agents.

There is also provided in accordance with the invention a formable homogeneous collagen composition comprising at least about 0.5% by weight of the total solids thereof of a crosslinking or hardening agent uniformly dispersed therein, said crosslinking agent being selected from the group consisting of unsaturated fatty acids having more than two double bonds, di and tri fatty acid esters of a polyhydric alcohol and unsaturated fatty acids having more than two double bonds, natural oils containing fatty acid esters with at least 11% by weight of the fatty acid residues thereof having more than two double bonds, fatty acid esters of an unsaturated fatty acid and an unsaturated fatty alcohol, and mixtures of the same, Preferably, collagen compositions of the invention comprise at least about 6% by weight of collagen solids and contain noncollagenous fibers in an amount from about 5% to about 30% by weight of the dry solids content of said composition.

Reference to the terms "total solids", "solids content", and "dry solids content" as used throughout this specification and in the appended claims with respect to the collagen composition and casings of the invention is intended to refer to, and should be understood as referring, to the weight of all ingredients in such compositions and casings excluding water and glycerol.

To obtain the collagen compositions of the present invention, the crosslinking agent is added to, and preferably uniformly dispersed in, the collagen compositions prior to forming desired shaped structures therefrom such as, for example, tubular food casings. In this manner, the crosslinking agent is incorporated and uniformly dispersed in the wall of the shaped collagen structure, eliminating the need for certain processing steps and for treatment with certain of the agents generally employed during the processing sequence for tubular collagen structures such as food casings.

The collagen compositions of the invention may be prepared by any of the methods known in the art using collagen tissues obtained from a variety of raw materials as, for example, limed and unlimed animal hide splits and tendon.

Crosslinking agents that are suitable for use in accordance with the present invention are unsaturated fatty acids having more than two double bonds such as, for example, linolenic acid.

Suitable fatty acid ester crosslinking agents are the di and tri fatty acid esters of a polyhydric alcohol and unsaturated fatty acids containing more than two double bonds. The fatty acids may be derived from synthetic or natural sources. The esters can be used in their pure state or in the form of their technical grades and can have a single fatty acid or a mixture of fatty acids such as are obtained from fish and vegetable oils, animal fats, and the like.

Also suitable as crosslinking agents in accordance with the present invention are the natural fish and vegetable oils containing fatty acid esters with at least 11% by weight of the fatty acid residues thereof having more than two double bonds. Exemplary of such suitable natural oils are linseed oil, cod liver oil, and marine oil.

Also suitable are fatty acid esters of an unsaturated fatty acid and an unsaturated fatty alcohol such as, for example, may be derived from sperm oil.

The term "fatty acid" as used herein is definitive of a group of aliphatic carboxylic acids that have widespread occurrence in natural fats, oils and allied substances. Such acids generally contain from 8 to 22 carbon atoms. The polyhydric alcohols used in forming the esters are alcohols containing at least 3 carbon atoms such as diethylene glycol, propylene glycol, glycerol, sorbitol, mannitol and the like.

In a preferred embodiment of the invention, collagen-containing tissue as, for example, limed animal hide splits, cleaned and prepared by methods well known in the art, are diced or coarsely chopped into pieces about ½ inch to 2 inches in size to facilitate transfer and agitation. After an additional treatment with lime and subsequent water wash, the hide pieces are subjected to treatment with a collagen swelling agent. Any of the known collagen swelling agents may be employed, but it is preferred to use dilute lactic, acetic or hydrochloric acid solutions. Collagen pieces are treated with swelling agent for an extended period of time, such as, for example, 4 to 9 hours or even longer, and, generally, until the character of the collgen material has completely changed from opaque to translucent. The swollen collagenous material is then washed with water to reduce the amount of residual acid and, generally, until the pH of the comminuted swollen collagen ranges between about 2.5-3.5. The swollen collagen is then drained, leaving pieces generally referred to as "acid-swollen chips".

As disclosed in U.S. Pat. No. 3,782,977 to Henderson et al, non-collagenous fibers that are to be incorporated into the collagen composition are first formed into a viscous aqueous fibrous dispersion that may contain between about 2% and 10% by weight of the noncollagenous fibers and between about 0.1% and b 10% by weight of a viscosity control agent that is preferably water soluble or water dispersible. Suitable viscosity control agents include, for example, methyl cellulose, gelatin, starch, and particularly, a dispersion of swollen collagen particles. Non-collagenous fibers that may be employed are any of the non-shrinking and essentially inert fibrous additives known to be suitable in collagen compositions such as, for example, wood, cotton, rayon, other cellulosic fibers, non-cellulosic fibers such as polyester, polyamide and the like.

Acid-swollen chips to be used in the preparation of the formable collagen composition are, preferably, further comminuted prior to mixing with the aqueous fibrous dispersion. The acid-swollen chips may be partially subdivided by means known in the art, such as by coarse grinding or crushing, to prepare a mass containing a predominance of chunks having major dimensions of about ⅛ inch to ½ inch.

The crosslinking agent, water as water or ice, and a portion of the acid-swollen collagen chips are added to and thoroughly mixed with the viscous fibrous dispersion in a suitable dough mixer or other similar mixing equipment, and then the remainder of ground, acid-swollen chips are admixed therewith, whereby the fibrous additive and crosslinking agent components are uniformly distributed throughout the collagen mass in a relatively short time, as, for example, between about 2 and 10 minutes. Towards the end of the mixing step, the collagen mass becomes much more viscous which helps in preventing separation of the various components during forming and subsequent processing thereof.

It is important that during grinding and mixing of the acid swollen chips, the temperature of the collagen mass be kept low and the temperature of the mass is, in general, maintained below about 25° C.

The collagen composition that is prepared preferably comprises at least about 6% by weight of collagen solids, and has uniformly incorporated therein between about 5% and 30% by weight of non-collagenous fibers based on the weight of total solids. Also uniformly incorporated therein is the crosslinking agent of the invention in an amount of at least about 0.5% by weight up to about 15% by weight and preferably between about 1% to about 5.0% by weight, of the solids content in the collagen composition. In accordance with the present invention, the quantity of crosslinking agent needed to impart the desired improved strength and cooking characteristics is important, but may be varied over a relatively wide range, and may be substantially in excess of that actually required. In general, however, amounts of crosslinking agent greater than about 5% by weight of total solids in the collagen composition may cause collagen structures prepared therefrom to shrink excessively, and amounts greater than about 15% by weight may have other detrimental effects on collagen structures prepared therefrom and should, therefore, be avoided.

In alternative embodiments of the invention, the crosslinking agent may be added directly to the fibrous dispersion mixture before mixing the same with the ground acid swollen chips or may be added to a swollen low collagen solids slurry prepared in accordance with any of the methods known in the art before or after adding other ingredients thereto.

The uniform high collagen solids composition so prepared is suitable, with only limited further processing, for forming into commercially acceptable formed or extruded collagen structures. A screw extruder or similar device can be used to transfer the collagen composition to homogenization equipment used in final preparation of the composition for extrusion.

Exemplary of a preferred method of preparing a tubular collagen structure such as, for example, a tubular food casing, a collagen composition of the invention is pumped and metered through an extrusion nozzle to form a continuous tube of collagen, which tube is strong enough to support itself in a tubular configuration with a low pressure inflation air while being conveyed to and through a predryer. The partially dried collagen tubing is then collapsed between nip rolls, neutralized by passing through a dip tank containing very dilute ammonium hydroxide, washed by passing through water tanks, and then plasticized by being conveyed through a dilute glycerine solution. The tubing is then reinflated with low pressure air, conveyed through a dryer while maintaining the tubular configuration, and then, if desired, shirred into a shirred casing stick by passing through a shirring apparatus.

Collagen tubing prepared from collagen composition of the invention in the manner herein described perform satisfactorily through each of the various processing steps with, in general, no problems being encountered. Moreover, it has been found that tubular collagen casing prepared in accordance with the practice of the invention, performs very satisfactorily during stuffing and linking operations and exhibits substantially improved resistance to "frying splits" during cooking.

Tubular collagen food casings of the present invention have the crosslinking agents herein described uniformly incorporated therein in an amount of at least about 0.3% up to about 9% by weight, and preferably between about 0.5% to about 3% by weight, of all components of said casing. Especially preferred are tubular collagen food casings having uniformly incorporated therein from about 3% to about 19% by weight of noncollagenous fibers based on the weight of all components of said casings.

The following examples are set forth as illustrating embodiments of the present invention and are not intended in any way to indicate the limits of the invention. Parts and percentages, unless otherwise indicated, are by weight.

EXAMPLE 1

1741 pounds of limed beef hide splits were chopped into approximately ¼ to 2 inch pieces and subjected to an additional lime treatment by charging into a tank together with 122 lbs of lime and sufficient water to give a water to hide ratio of 3.6 to 1. The lime treatment was continued for 57 hours with intermittent agitation. After the lime treatment, the chips were leached with water for about 8 hours, swollen with pH 1 hydrochloric acid, washed with water to a hide pH of 2.6. The hide was then drained and chilled to about 1° C.

Two other batches of acid swollen hide chips were prepared using the procedure hereinabove described and the proportion of ingredients and process conditions noted in Table I, below. Batch No. 2 included an equilibration step in weak acid solution before the hide was finally drained and chilled. Also included in Table I, are the proportion of ingredients and process conditions used in the preparation of the swollen hide chips hereinabove described.

Table I

| | Preparation of acid swollen hide chips from limed beef hide splits. | | | | | | | | | | |
|---|---|---|---|---|---|---|---|---|---|---|---|
| | | | Water | | Leach | | | | Wash | | Equilibration |
| Preparation Batch No. | Hide weight (lb) | lime weight (lb) | to hide ratio | Lime time (hr) | time (hr) | flow (gpm) | time (hr) | flow (gpm) | time (hr) | flow (gpm) | time (hr) |
| 1 | 1741 | 122 | 3.6:1 | 57 | 8.3 | 10 | — | — | 5 | 10 | — |
| 2 | 1565 | 110 | 4.1:1 | 92 | 8 | 30 | 16 | 12 | 1.3 | 30 | 14 |
| 3 | 101 | 13 | 7.5:1 | 67 | 24 | 2.2 | — | — | 2 | 4.7 | — |

A cellulose fiber dispersion was prepared using the following proportion of ingredients:

| | |
|---|---|
| Ground acid - swollen chips | 30 lbs. |
| Wood cellulose fibers | 20.9 lbs. |
| Water | 299 lbs. |

The wood cellulose fibers used had an average fiber length of about 0.040 inch. Sheets of fibers were separated into convenient pieces, soaked in a portion of the water for about 60 minutes and then mixed for about two minutes, soaked for an additional 30 minutes, and then mixed for about two minutes. The rest of the ingredients were added to the mixer, and the mixture was blended for about 100 minutes. The resulting wood cellulose fiber suspension was smooth, highly viscous, free of fiber clumps, and had a composition of collagen solids 1%, wood cellulose fibers 5.6% and water 93.4%.

A series of collagen compositions of 50 to 265 lbs. having a total solids of 11.1% were prepared using the following proportion of ingredients:

| | |
|---|---|
| ground acid - swollen chips | variable |
| Wood-cellulose dispersion | 1.7% |
| Cod liver oil | variable |
| Water | 88.7% |

Acid-swollen chips prepared as described hereinabove were ground in a meat grinder into pieces substantially between about ⅛ inch to ¼ inch in size prior to blending with the viscous cellulose fiber dispersion. The temperature during grinding of the chips was controlled so as not to exceed about 20° C.

Blending of the ground acid-swollen chips, cellulose fiber dispersion, water, and the cod liver oil was conducted as follows:

The ingredients were mixed in two steps. In the first step, the cod liver oil, the water as water or as ice, and a portion of the ground acid-swollen chips were added to the cellulose fiber dispersion and mixed well. The weight of cellulose fiber dispersion was adjusted so that cellulose fibers were 15% of total solids plus cod liver oil. In the second mixing step the mixture was blended with the remainder of the ground, acid-swollen chips until the composition was homogeneous and began to adhere to the blending equipment. Care was taken during the preceding two mixing steps that the temperature of the composition did not exceed 20° C. The second mixing step normally required five minutes of mixing.

The mixing steps were conducted in an appropriately-sized screw mixer of the type commonly used in preparing sausage emulsions. The components of the various collagen compositions of the example are summarized in Table II below:

Table II

Contents of collagen compositions

| Collagen composition number | Collagen (% of solids) | Cod liver oil (% of solids) | Weight of collagen composition (lb.) | Acid-swollen chip preparation number (Table I) |
|---|---|---|---|---|
| A | 85 | 0 | 60 | 1 |
| B | 83 | 2 | 60 | 1 |
| C | 85 | 0 | 70 | 2 |
| D | 84.5 | 0.5 | 70 | 2 |
| E | 83 | 2 | 70 | 2 |
| F | 85 | 0 | 265 | 3 |
| G | 80 | 5 | 50 | 2 |
| H | 70 | 15 | 50 | 2 |

Compositions A and B were prepared together and then, employing the procedure described below, were used in the preparation of tubular casings. Compositions C, D and E were prepared together and were then used in the preparation of tubular casings employing the procedure of this example. Compositions F, G and H were similarly prepared together and then used in the preparation of tubular casings.

After preparing each of the various collagen compositions, the composition was fed through a rotary-shear homogenizer by means of a screw extruder and pump. To prevent degradation of the collagen, the homogenizer rotor and stator were cooled with a coolant maintained at a temperature about −5° C.

After homogenization, the blend was pumped through two parallel filters with 0.003 slots to break up any remaining collagen lumps and remove any non-dispersed matter.

The filtered collagen blends were pumped and metered through an extrusion nozzle having a counter-rotating cup and core with a 0.006 gap to form a continuous tube of collagen. The extruded tubes were inflated with low-pressure inflation air while being conveyed on horizontal rolls.

The inflated collagen tubing was partially dried and hardened by passing through a predryer at 50° C., then collapsed between nip rolls, neutralized by passing through a dip tank containing 0.06 N ammonium hydroxide, washed by being conveyed through water tanks and then plasticized by being conveyed through a dilute glycerine solution.

The tubing samples were then reinflated with low pressure air, dried in air at 100° C., moisturized in an equalizer at 70% RH and then shirred by passing through a shirring apparatus.

After shirring the casing was baked at 72° C. for 20 hours, cooled, humidified to 15% moisture by passing humid air through the casing, and packaged.

Tubular collagen casings of this example were evaluated for physical strength and employed in the manufacture of pork sausages using conventional stuffing and linking procedures. Stuffed casings were evaluated for cooking characteristics. The results of the evaluation tests are summarized in Table III below. Casings prepared together should be compared and casings prepared at different times cannot readily be compared. Thus Casings A and B can be compared, Casings, C, D and E can be compared, and Casings F, G and H can be compared.

Table III

Pork sausage fry splits and burst pressures of cod liver oil containing casings

| Collagen composition number | Cod liver oil content (wt. %) | | Burst pressure (mm mercury) | | Pork sausage fry splits (% of links fried) |
|---|---|---|---|---|---|
| | % of solids | % of casing | Wet | Cooked | |
| A | 0 | 0 | 120 | 62 | 11 |
| B | 2.0 | 1.1 | 163 | 122 | 2 |
| C | 0 | 0 | 98 | 48 | 80 |
| D | 0.5 | 0.3 | 100 | 56 | 80 |
| E | 2.0 | 1.1 | 103 | 72 | a |
| F | 0 | 0 | 125 | 85 | 11 |
| G | 5 | 2.8 | 137 | 105 | 0 |
| H | 15 | 8 | 143 | 130 | 0 | a - not measured

The performance in pork sausage manufacture and the physical strength of cod liver oil containing casings as shown in Table III were superior to that of control casings containing no cod liver oil. Casings containing cod liver oil crosslinking agent exhibited increased wet burst pressures over those of the control casings. Wet burst pressures were measured by soaking the casing in water and measuring the pressure in millimeters of mercury required to burst the casing. Cooked burst pressures were likewise increased for cod liver oil-containing casings when compared to control casings containing no cod liver oil. Cooked burst pressures were measured by soaking the casing in water, immersing it in boiling water for two minutes, cooling the casing and measuring the pressure in millimeters of mercury required to burst the casing.

All the casing samples of the example were readily stuffed and linked without damage thereto. Casings prepared from Composition B exhibited markedly reduced splitting during frying compared to casings prepared from Composition A, as did casings prepared from Compositions G and H compared with casings from Composition F. Casings prepared from Composition H shrank excessively causing excessive exposure of emulsion and an unattractive appearance in spite of elimination of splitting during frying, and casings prepared from Composition G shrank during frying somewhat more than did the emulsion, leaving a small amount of exposed emulsion at the ends of some of the fried sausages. Casings prepared from Composition B exhibited markedly improved resistance to frying splits while shrinking with the sausage meat during frying and exhibiting a pleasing cooked appearance.

EXAMPLE 2

Using the procedure of Example 1, ground acid-swollen chips were prepared from 1491 pounds of limed hide splits that were subjected to an additional lime treatment with 150 pounds of lime with a water-to-hide ratio of 4.4 to 1. The lime treatment time was 50 hours. A water leach of 6 hours at 10 gpm water flow, and a water wash of 4 hours at 10 gpm water flow were also employed. The equilibration step was omitted.

A cellulose fiber dispersion was prepared as described in Example 1 except that a collagen composition of 11.1% solids was used in place of ground, acid-swollen chips. The resulting wood cellulose fiber dispersion was smooth, highly viscous, free of cellulose fiber clamps, and had a composition of collagen solids 1%, wood cellulose fibers 5.6%, and water 93.4%.

A series of 100 lb. collagen compositions containing various unsaturated fats was prepared using the procedure described in Example 1 and had the proportion of ingredients reported in Table IV below.

measured using the methods described in Example 1, is shown in Table V.

TABLE V

| | Unsaturated fat | | Burst pressure (mm mercury) | |
|---|---|---|---|---|
| Sample | % of casing weight | Type | After wetting | After cooking |
| A | none | (control) | 137 | 86 |
| B | 0.6 | linolenic acid | 159 | 107 |
| C | 0.6 | sperm oil | 153 | 103 |
| D | 0.6 | edible marine oil | 161 | 117 |
| E | 0.6 | cod liver oil | 169 | 122 |
| F | 0.6 | boiled linseed oil | 175 | 118 |

When stuffed with pork sausage emulsion, linked, and fried, Casing Samples A to F produced sausages with a pleasing appearance. Casing Samples B–F had no tendency to split excessively during frying, nor did they shrink more than the meat in the longitudinal direction.

EXAMPLE 3

Acid-swollen chips were prepared using the procedure of Example 1 from 1742 pounds of limed beef hide splits that were subjected to an additional lime treatment with 150 pounds of lime for 54 hours using a water to hide ratio of 3.6 to 1, and then leached with water for 8.2 hours at 10 gpm water flow. The acid-swollen chips were washed with water for 4 hours at 10 gpm water Table IV Collagen compositions - proportion of ingredients

| | | | Pounds of Ingredient Per 100 Pounds of Collagen Composition | | | |
|---|---|---|---|---|---|---|
| | Unsaturated fat | | | Wood- | | |
| Sample | % of Solids | Type | Ground acid-swollen chips | cellulose dispersion | Water | Unsaturated Fat |
| A | none | (control) | 57.6 | 39.7 | 2.7 | none |
| B | 1.0 | Linolenic acid (9,12,15-octadecatrienoic acid) | 56.9 | 39.6 | 3.4 | 0.11 |
| C | 1.0 | Sperm oil | 56.9 | 39.6 | 3.4 | 0.11 |
| D | 1.0 | Edible marine oil | 56.9 | 39.6 | 3.4 | 0.11 |
| E | 1.0 | Cod liver oil | 56.9 | 39.6 | 3.4 | 0.11 |
| F | 1.0 | Boiled linseed oil | 56.9 | 39.6 | 3.4 | 0.11 |

The cod liver oil employed in this example and in Example 1 was purchased from Rexall Drug Co., under the designation Cod Liver Oil, N.F.

The linolenic acid (9,12,15-octadecatrienoic acid) used was a 55% concentrate of linolenic acid purchased from Nutritional Biochemicals, Cleveland, Ohio.

The sperm oil used was a natural oil derived from whales reported as being composed of about ⅜ waxes comprising esters of an unsaturated aliphatic fatty acid and an unsaturated aliphatic fatty alcohol. The sperm oil used in this example was purchased as catalogue #SX860 from Matheson, Coleman and Bell, Norwood, Ohio.

The edible marine oil used was a refined, bleached marine oil having a saponification value of 180–195, and an iodine value of 160 max purchased from Jahres Fabrikker, Sandefjord, Norway.

The boiled linseed oil was purchased as catalogue number LX305 from Matheson, Coleman and Bell, Norwood, Ohio.

After preparing the collagen composition, shirred sausage casing was produced and packaged as described in Example 1 except that the casing was baked at 60° instead of 72° C. and that humidification was to 17.5% moisture.

The physical strength of the casings containing the unsaturated fats was superior to that of control casing containing no unsaturated fats. The improved strength, flow. The equilibration step was omitted. The acid-swollen chips were ground as described in Example 1.

A cellulose fiber dispersion was prepared as described in Example 2, but with a small amount of a distilled monoglyceride (MYVATEX 25-07 Eastman Chemical Products, Inc.) also incorporated therein. Collagen compositions were prepared as described in Example 1 having the compositions B and C summarized in Table VI below.

Acid-swollen chips, prepared as in the preceding examples, from 2081 pounds of limed beef hide splits that were given an additional lime treatment with 150 pounds of lime for 72 hours in a water to hide ratio during liming of 2.8:1, were also used in collagen compositions of this example.

A cellulose fiber dispersion, prepared as described above in this example, was blended with ground acid-swollen chips as described in Example 1 to form Compositions D and E with proportions summarized in Table VI below.

The cod liver oil used in this example was purchased from Nutritional Biochemicals, Cleveland, Ohio.

TABLE VI

| Collagen composition | Cellulose fibers (% of solids) | Collagen (% of solids) | Cod liver oil (% of solids) |
|---|---|---|---|
| A | 20 | 80 | 0 (control) |

TABLE VI-continued

| Collagen composition | Cellulose fibers (% of solids) | Collagen (% of solids) | Cod liver oil (% of solids) |
|---|---|---|---|
| B | 20 | 79.5 | 0.5 |
| C | 20 | 79 | 1.0 |
| D | 20 | 80 | 0 (control) |
| E | 20 | 79.75 | 0.25 |

After preparing the collagen compositions, shirred sausage casings were produced and stuffed as described in Example 2. The physical strength and the fry performance of these sausage casings is shown in Table VII below.

TABLE VII

| Collagen casings from compositions | Cod liver oil (% of casing weight) | Casing burst pressure (mm mercury) Wet | Cooked | Pork sausage pan fry splits (%) |
|---|---|---|---|---|
| A | 0 | 137 | 53 | 8 |
| B | 0.3 | 144 | 79 | 0 |
| C | 0.6 | 141 | 81 | 0 |
| D | 0 | 131 | 54 | 2 |
| E | 0.15 | 147 | 79 | 6 |

The physical strength of the casings containing cod liver oil was superior to that of the control casing containing no cod liver oil. The cooked strength particularly was improved over the control.

When stuffed with pork sausage emulsion, linked and fried, the casings from Compositions B and C produced sausages which did not split during pan frying while the control casing (Casing A) exhibited 8% fry splits. Sausages of pleasing appearance were prepared from each of the casings of this example.

EXAMPLE 4

Using the procedure of Example 1, ground acid-swollen chips were prepared from 1,873 pounds of limed cattle hide splits that were subjected to an additional lime treatment with 150 pounds of lime with a water-to-hide ratio of 3.3 to 1. The lime treatment time was 58 hours. A water leach of eight hours at 10 gpm water flow and a wash after acid swelling of four hours at 10 gpm were also employed. The equilibration step was omitted.

A cellulose fiber dispersion was prepared using the following proportion of ingredients:

| Ground acid-swollen chips | 12.0 lbs. |
| Wood cellulose fibers | 10.0 lbs. |
| Water | 103.5 lbs. |
| Ice | 42.0 lbs. |
| Concentrated hydrochloric acid 20° Baume | 28.5 grams |

The wood cellulose fibers had an average fiber length of about 0.02 inch. The wood cellulose fiber, the ice and the ground acid-swollen chips were mixed for five minutes. The water and concentrated hydrochloric acid were then added and the mixing was continued for a total of 60 minutes. The resulting wood cellulose fiber suspension was smooth, highly viscous, free of fiber clumps and had a composition of collagen solids 1%, wood cellulose fibers 5.6% and water 93.4%.

Two 106 pound collagen compositions were prepared as described in Example 1 having the compositions summarized in Table VIII.

TABLE VIII

| Collagen Composition | Cellulose Fibers (% of Solids) | Collagen (% of Solids) | Cod liver oil (% of Solids) |
|---|---|---|---|
| A | 20 | 80 | 0 |
| B | 20 | 79 | 1.0 |

The cod liver oil used in this example was purchased from Nutritional Biochemicals Corporation, Cleveland, Ohio.

After preparing the collagen compositions, shirred sausage casings were produced as described in Example 1 except that the bake temperature was varied as described in Table IX below and that humidification was to 17.5% moisture. Shirred collagen casings of this example were employed in the manufacture of pork sausages as described in Example 1. The tubular casings of this example were evaluated for casing burst strength and cooking characteristics using the procedure described in Example 1 and the results of these evaluations are summarized in Table IX below.

TABLE IX

| Casing Sample | Cod liver oil (% of casing weight) | Bake Temperature (° C.) | Burst Pressure (mm Mercury) After Wetting | After Cooking | Sausage Frying Splits (% of links fried) |
|---|---|---|---|---|---|
| A | 0 | 60 | 152 | 75 | 8 |
| B | 0.6 | 60 | 158 | 95 | 9 |
| C | 0 | 70 | 167 | 102 | 15 |
| D | 0.6 | 70 | 166 | 115 | 9 |
| E | 0 | 80 | 165 | 119 | 15 |
| F | 0.6 | 80 | 164 | 135 | 6 |

The cooked burst strength of each of the casing samples increased as the bake temperature increased. However, at each bake temperature, Casing Samples B, D and F which contained cod liver oil had cooked burst strengths 13 to 20 mm of mercury greater than did the Casing Samples A, C and E which did not contain cod liver oil.

When stuffed with pork sausage emulsion, linked and fried, the casings produced sausages with a pleasing appearance. Casings D and F which contained cod liver oil and were baked at 70° C. and at 80° C. exhibited somewhat less "frying splits" then Casings C and E which were baked at corresponding temperatures but did not contain cod liver oil.

In producing the collagen composition of the present invention, any other ingredient well known to those skilled in the art which can be utilized to impart a particular characteristic or property to collagen structures obtained therefrom may also be present, if desired. Moreover, the collagen compositions of the invention may be shaped or formed into any of a wide variety of desired structures.

While the process and products of the present invention have been described with great particularity in order to disclose the best known and preferred form of the invention, it should be understood that changes, modifications and alterations can be made therein without departing from the scope and spirit of the invention.

What is claimed is:

1. A homogeneous formable collagen composition having uniformly incorporated therein at least about 0.5% by weight up to about 15% by weight based on the solids content thereof of a crosslinking agent selected from the group consisting of unsaturated fatty acids having more than two double bonds, tri-fatty acid esters of glycerol and unsaturated fatty acids having more than two double bond, natural oils containing fatty acid esters with at least 11% by weight of the fatty acid residues thereof having more than two double bonds, fatty acid esters of an unsaturated fatty acid and an unsaturated fatty alcohol, and mixtures of the same.

2. The collagen composition of claim 1 wherein said collagen composition contains between about 1% to about 5% by weight of the dry solids content thereof of said crosslinking agent.

3. The collagen composition of claim 1 wherein said crosslinking agent is a natural oil containing fatty acid esters with at least 11% by weight of the fatty acid residues thereof having more than two double bonds.

4. The collagen composition of claim 3 wherein said crosslinking agent is a fish oil.

5. The collagen composition of claim 1 wherein said collagen composition comprises at least about 6% by weight of collagen solids.

6. The collagen composition of claim 3 wherein said collagen composition contains from about 5% to about 30% by weight of the dry solids content thereof of non-collagenous fibers.

7. A collagenous tubular food casing having uniformly incorporated therein at least about 0.3% by weight to about 9% by weight of said casing of a crosslinking agent selected from the group consisting of unsaturated fatty acids having more than two double bonds, tri fatty acid esters of glycerol and unsaturated fatty acids having more than two double bonds, natural oils containing fatty acid esters with at least 11% by weight of the fatty acid residues thereof having more than two double bonds, fatty acid esters of an unsaturated fatty acid and an unsaturated fatty alcohol, and mixtures of the same.

8. The tubular casing of claim 7 having uniformly incorporated therein from about 3% to about 19% by weight of said casing of non-collagenous fibers.

9. The tubular casing of claim 7 having uniformly incorporated therein between about 0.5% and about 3% by weight of said crosslinking agent.

10. The tubular casing of claim 7 wherein said crosslinking agent is a natural oil containing fatty acid esters with at least 11% by weight of the fatty acid residues thereof having more than two double bonds.

11. The tubular casing of claim 7 wherein said crosslinking agent is a fish oil.

12. A method of preparing a formable collagen composition suitable for use in preparing a shaped collagen structure including the step of uniformly incorporating into a formable collagen composition a crosslinking agent selected from the group consisting of unsaturated fatty acids having more than two double bonds, tri fatty acid esters of glycerol and unsaturated fatty acids having more than two double bonds, natural oils containing fatty acid esters, with at least 11% by weight of the fatty acid residues thereof having more than two double bonds, fatty acid esters of an unsaturated fatty acid and an unsaturated fatty alcohol, and mixtures of the same in an amount of at least about 0.5% by weight up to about 15% by weight of said crosslinking agent based on the solids content of said collagen composition.

13. A method as claimed in claim 12 wherein said formable collagen composition comprises at least about 6% by weight of collagen solids.

14. A method as claimed in claim 12 wherein said crosslinking agent is a natural oil containing fatty acid esters with at least 11% by weight of the fatty acid residues thereof having more than two double bonds.

15. A method as claimed in claim 12 wherein said crosslinking agent is a fish oil.

16. A method as claimed in claim 12 wherein between about 1% by weight to about 5% by weight of said crosslinking agent is incorporated in said collagen composition.

17. A method of preparing a formable collagen composition suitable for use in preparing a shaped collagen structure including the steps of:
  a. preparing a viscous aqueous dispersion of non-collagenous fibers;
  b. preparing a comminuted pre-swollen collagen mass; and then
  c. admixing said aqueous fiber-dispersion and an amount of crosslinking agent selected from the group consisting of unsaturated fatty acids having more than two double bonds, tri fatty acid esters of glycerol and unsaturated fatty acids having more than two double bonds, natural oils containing fatty acid esters with at least 11% by weight of the fatty acid residues thereof having more than two double bonds, fatty acid esters of an unsaturated fatty acid and an unsaturated fatty alcohol, and mixtures of the same with said pre-swollen collagen mass so that at least about 0.5% by weight up to about 15% by weight of said crosslinking agent based on the solids content of said collagen admixture is incorporated in the collagen composition and then thoroughly mixing until a uniform admixture is obtained.

18. A method as claimed in claim 17 wherein between about 1% by weight and 5% by weight of said crosslinking agent is incorporated in said collagen composition.

19. A method as claimed in claim 17 wherein said crosslinking agent is a fish oil.

* * * * *